(12) United States Patent
Norris

(10) Patent No.: US 6,708,995 B2
(45) Date of Patent: Mar. 23, 2004

(54) UTILITY CART

(76) Inventor: Richard Norris, 381 E. Main St., Manasquan, NJ (US) 08736

( * ) Notice: Subject to any disclaimer, the term of this patent is extended or adjusted under 35 U.S.C. 154(b) by 0 days.

(21) Appl. No.: 10/122,705

(22) Filed: Apr. 12, 2002

(65) Prior Publication Data

US 2003/0193156 A1 Oct. 16, 2003

(51) Int. Cl.$^7$ ................................................. B62B 1/04
(52) U.S. Cl. .................... 280/204; 280/149.2; 280/652; 280/47.21
(58) Field of Search ............................. 280/149.2, 204, 280/651, 652, 47.21, 47.131, 47.17, 405.1, 79.11

(56) References Cited

U.S. PATENT DOCUMENTS

| | | | |
|---|---|---|---|
| 2,387,093 A | * 10/1945 | Schmied ...................... 280/63 |
| 3,909,042 A | 9/1975 | Miller | |
| 4,561,674 A | * 12/1985 | Alessio ........................ 280/655 |
| 4,928,985 A | 5/1990 | Nowlin | |
| 5,480,180 A | * 1/1996 | Fuller et al. ................. 280/656 |
| 5,599,033 A | 2/1997 | Kolbus et al. | |
| 5,636,852 A | 6/1997 | Sistrunk et al. | |
| 5,832,874 A | 11/1998 | Ravin | |
| 5,842,710 A | 12/1998 | Couture | |
| 5,944,333 A | * 8/1999 | Kent ........................... 280/204 |
| 6,325,395 B1 | * 12/2001 | Frymoyer ................. 280/47.26 |
| 6,491,316 B1 | * 12/2002 | Freeman .................... 280/204 |
| 2002/0070517 A1 | * 6/2002 | Ramsey ................... 280/47.19 |

* cited by examiner

*Primary Examiner*—Kevin Hurley
(74) *Attorney, Agent, or Firm*—Daniel Kirshner, Esq.

(57) ABSTRACT

A utility cart which includes means for attachment to a common bicycle or which can be drawn by hand. Includes a main body compartment formed from a bottom panel, two side panels and a front and a back panel. Two wheels are attached to an axle which is attached to the bottom panel of the main body compartment via a selection of axle supports. Includes front and rear exterior equipment retaining modules in the form of cylindrical units having bottom stops. Any number of equipment retaining modules are envisioned and preferred embodiment shown and described herein includes four in the front and four in the rear. Means for attachment to a typical prior art bicycle is included. The means for attachment permits rotation along three planes thereby providing the smoothest possible transport of the cart and items contained therein. Removable legs are provided which can be attached if the cart is to be stationary, or can be removed when the utility cart is to be in motion.

1 Claim, 5 Drawing Sheets

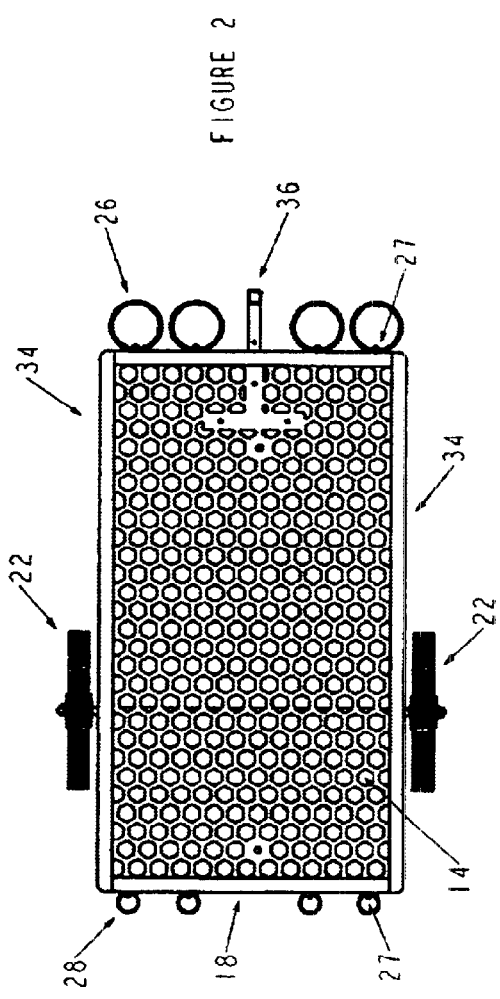
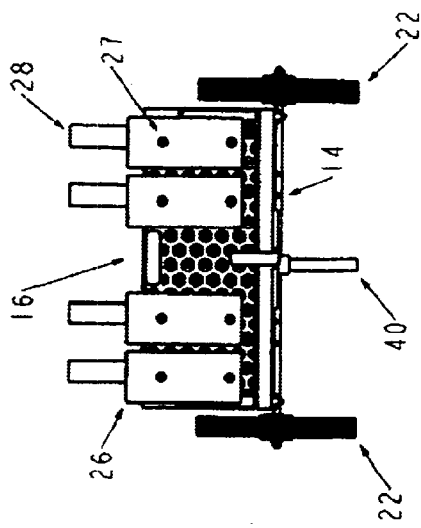
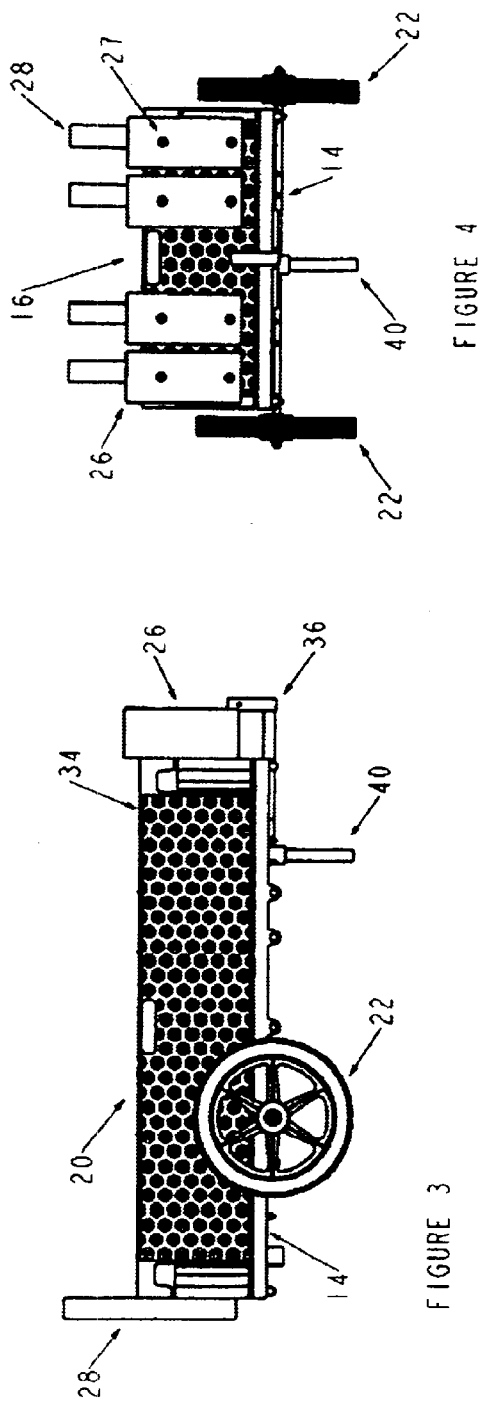

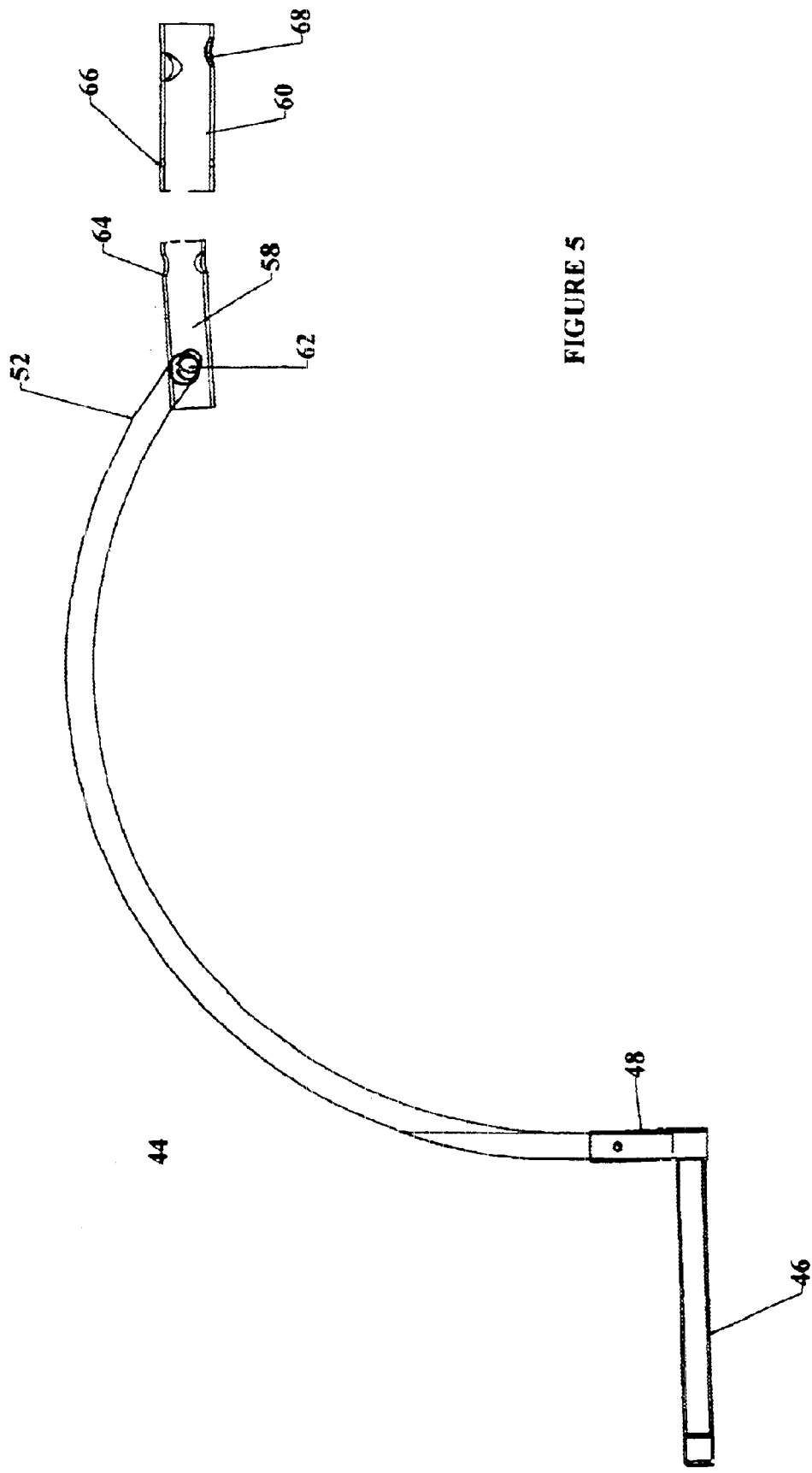

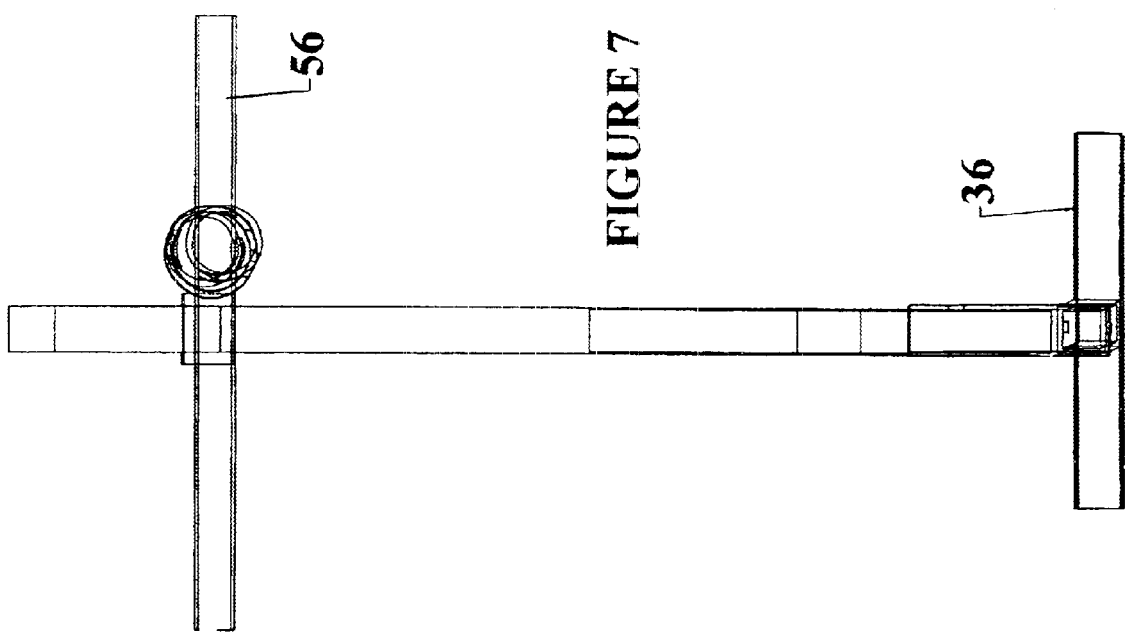

UTILITY CART

FIELD OF THE INVENTION

The present invention is a utility cart which may be attached to a bicycle or may be pulled by hand. More specifically, the present invention is a two-wheeled cart which includes a main carrier section, front and rear equipment holders for retaining umbrellas, fishing rods and the like, and includes an selectively positionable axle.

BACKGROUND OF THE INVENTION

People often like to carry umbrellas, fishing rods, bottles of soda pop, coolers, radios, and a great variety of items to the beach or to other outdoor locations. It is frequently difficult for a person to carry all of these items on their person. It would be an advantage for the person to have available a utility cart to carry all of these items. It would be even more advantageous if the utility cart included a large main carrying section for bulkier items such as a cooler filled with food and drink and also external carrying modules for transporting umbrellas, fishing poles, and the like. It would be yet further advantageous if the cart were wheeled and the wheels could be selectively positioned forward or backward depending on the load to be carried. Finally, a further advantage would be presented if the cart is attachable to a conventional bicycle so that a user could tow the cart at greater speed, or alternatively the cart could be drawn by hand if desired.

There are several prior art utility carts for attachment to a bicycle. However, none of the prior art devices combines all of the unique features and inventive combinations of the present invention. One example of a prior art device is disclosed is U.S. Pat. No. 3,909,042 entitled Movable Carrying Structure which was issued to Miller on Sep. 30, 1975. This patent discloses a carrying structure for carrying children that includes a wheeled carrying unit which is connected to a bicycle by way of swivel means.

Another example of the prior art is shown by Kent in U.S. Pat. No. 5,944,333 entitled Utility Cart for Beach Gear which was issued on Aug. 31, 1999. This patent disclosed a cart for attachment to a bicycle which includes an L-shaped frame member, a pair of wheels attached to a pair of brackets, and means for attachment to a bicycle.

Yet a third prior art example of a cart for attachment to a bicycle is disclosed by Nowlin in U.S. Pat. No. 4,928,985 entitled Bicycle Buggy Apparatus issued on May 29, 1990. This shows a bicycle buggy attachment that includes an "S" shaped coupling shaft.

It is clear that none of the prior art contains the unique, utilitarian and inventive features contained in the present invention utility cart. The present invention utility cart for attachment to a conventional bicycle includes attachment means to attach the cart to a bicycle, a main carrying section for retaining gear, and front and rear equipment holders for retaining umbrellas, fishing rods and the like. Furthermore, the instant utility cart includes a selection of axle supports so that an axle can be selectively positioned forward or aft depending on the center of gravity of the load contained in the main carrying section of the cart.

Therefore it is an objective of the present invention to provide a utility cart for use on the beach or elsewhere that is most favorably adapted for its selected use. It is advantageously outfitted with equipment holders, front and rear, to permit the maximum transportation of umbrellas, fishing rods, soda pop bottles, cups or other items. The axle is selectively movable to adapt to the load transported in the main carrying section. The cart is easily attached and/or detached to the saddle post of a convention bicycle so that it can be peddled by the bicycle rider, or can simply be pulled by hand from one location to another thereby transporting its contents.

It is further an objective of the present invention utility cart to provide a cart that is easy to manufacture and can be readily assembled or disabled for storage.

It is further an objective of the present invention utility cart to present a cart that is comprised mainly of open materials for ease of hosing down or other cleaning.

Such are the objectives, advantages and novel features and structural elements presented by the invention disclosed herein. Other objectives and novel features, further scope of applicability of the present invention will be set forth in the detailed description to follow, taken in conjunction with the accompanying drawings, or may be learned by practice of the invention. The objectives and advantages of the invention may be realized and attained by means of the instrumentalities and combinations particularly pointed out in the appended claims.

SUMMARY OF THE INVENTION

The present invention is a utility cart for carrying and transporting large or small loads, umbrellas, fishing rods and the like. The utility cart of the present invention includes means for attachment to a common bicycle so that the cart can be transported at greater speed. Alternatively, the cart can be drawn by hand by a user or by multiple users if bicycle attachment is not desired.

The utility cart has a main body compartment formed from a bottom panel, two side panels and a front and a back panel. Two wheels are attached to an axle which is attached to the bottom panel of the main body compartment via a selection of axle supports. A user may select appropriate axle supports thereby selecting from a number of axle positions in order to facilitate pulling the cart depending on the center of gravity of the load to be carried.

The utility cart includes front and rear exterior equipment retaining modules in the form of cylindrical units having bottom stops. Any number of equipment retaining modules are envisioned and preferred embodiment shown and described herein includes four in the front and four in the rear.

Means for attachment to a typical prior art bicycle is included. The means for attachment permits rotation along three planes thereby providing the smoothest possible transport of the cart and items contained therein.

Removable legs are provided which can be attached if the cart is to be stationary, or can be removed when the utility cart is to be in motion.

BRIEF DESCRIPTION OF THE DRAWINGS

For a better understanding of the present invention, reference is made herein to the following description of an exemplary embodiment thereof, considered in conjunction with the accompanying drawings, in which:

FIG. 2 is plan view of the utility cart of the present invention showing the cart assembled and without its handle.

FIG. 3 is elevation view of utility cart of the present invention showing the cart assembled and without its handle.

FIG. 4 is back view of the utility cart of the present invention showing the cart assembled and without its handle.

FIG. 5 is elevation view of the handle and bicycle attachment of the utility cart of the present invention.

FIG. 7 is a rear overhead view of handle and bicycle attachment of the utility cart of the present invention.

DETAILED DESCRIPTION OF THE INVENTION

Figure 1:
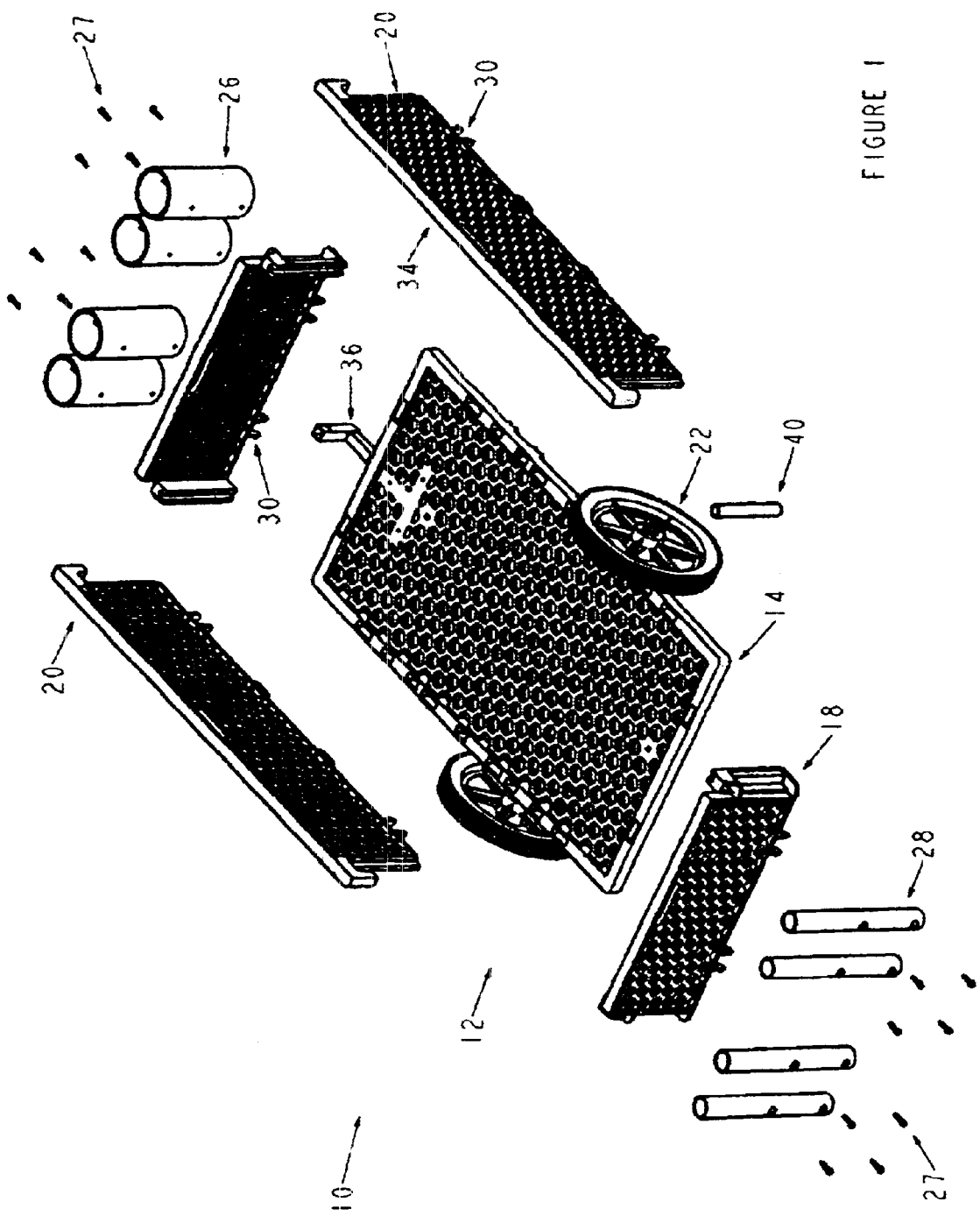
FIG. 1 is an exploded view of the utility cart of the present invention showing the cart without its handle.

Referring to FIGS. 1 through 5, the present invention is a utility cart 10 for attachment to a bicycle, or if desired, can be hand pulled by a user or users. Generally, the present invention bicycle cart comprises a main body compartment 12 having a bottom panel 14, a front panel 16, a back panel 18 and two side panels 20. Two wheels 22 are provided which are attached by way of an axle 24 to the bottom panel 14 wherein the axle and wheels are adjustable to move forward and backward. A plurality of front equipment retaining modules 26 for holding umbrellas, fishing rods, and the like are provided and attached to the front panel. Likewise, a plurality of back equipment retaining modules 28 are provided and attached to the rear panel. As shown, the front equipment retaining modules are depicted having a larger cross-sectional diameter than the rear equipment retaining modules. However, it should be realized that the modules are interchangeable if desired. Furthermore, although the invention as depicted indicates a total of eight modules, fewer or more modules can be utilized and such would fully be within the disclosure of the present invention.

The bottom panel, front panel, back panel and two side panels are formed from a rigid material and each of the panels is generally rectangular. In the embodiment shown, the panels are manufactured from molded plastic, although stainless steel or other rigid material could also be utilized. All of the panels are constructed from open section material, here shown as a honeycomb, to facilitate hosing down or washing the cart. The front, back and two side panels are all snapped to the bottom panel to form the main body compartment of the cart.

Referring now to FIG. 1, the front, back and side panels are provided with attachment clips 30 for attachment to the bottom panel where each of these panels includes four attachment clips which interact with corresponding attachment apertures 32 in the bottom panel. The attachment clips are positioned on the bottom edge of each of the panels and are grouped as two groups of two wherein each group of two resides in close proximity to a side edge of its panel. Specifically, the two attachment clips of each attachment clip pair are spaced from each other to approximate the size of the attachment aperture on the bottom panel. More specifically, each attachment clip includes a tongue at its bottom where the tongues of each pair face away from each other and are spaced to be just wider than the width of the attachment aperture. As such, when the side, front and rear panels are introduced into bottom panel, the attachment clips are squeezed together allowing passage of the clips into the attachment apertures. Once introduced, the resilient clips expand back to their original configuration and lock the panels to the bottom. As such, the component design of the main compartment of the utility cart insures that the cart can be assembled or disabled with facility in order to utilize the cart or store it in disassembled state.

Hand holds 34 are molded into the side panels and the front and rear panels of the utility cart to facilitate carrying the cart when assembled or transporting the component parts when the cart is disassembled.

Attached to the front of the bottom panel of the utility cart there is a T-shaped handle connector 36 having an upward vertical projection at its forward end. The handle connector is constructed from sections welded into a T shape wherein each section has a square cross section. The handle connector fits into a T-shaped recess in the bottom panel and is attached to the bottom panel with three nuts and bolts or other attachment means and the vertical projection extends upward beyond the forward end of the front panel.

Along the bottom of the longer side of the bottom panel are disposed a number of axle supports 38 so that a user can selectively position the axle of the utility cart. This is advantageous so that the utility cart can be utilized to transport a variety of different load types depending on the center of gravity of the load. For example, if the load is heaviest toward the front of the cart, the axle can be positioned along the bottom panel to the greatest advantage. As best can be appreciated from the side view seen in FIG. 3, the utility cart of the present invention includes axle supports 38 at five different positions. It will be understood that any plurality of axle supports are possible. It will also be understood that for each axle support on one side of the bottom panel, a second corresponding axle support will be provided on the opposite side so that the axle will be supported by the pair.

A pair of wheels 22 are attached to an axle 24 where any typical prior art wheels will be within the scope of this disclosure. The wheels are typically 14" in diameter and include rubber threads and ball-bearing hubs. Of course, other size wheels may be used so long as the axle connections are suitable.

The axle 24 is a solid round (cylindrical) bar which is stepped down and threaded on its ends to permit fitting the wheels onto the axle utilizing self-locking hub nuts. An appropriate pair of axle supports 38 are selected depending on the load to be transported. The axle supports are generally round apertures having a size chosen to be appropriate for the corresponding axle. The axle is inserted through the selected pair of axle supports and the two wheels are attached to the axle utilizing self-locking hub nuts.

A plurality of front equipment holders 26 are provided and attached to the exterior of the front panel 16 of the utility cart. The front equipment holders are tubular in configuration, extruded from plastic, and include a long bottom attachment bolt which acts as a bottom stop. In the preferred embodiment shown, four front equipment holders are provided and are formed from PVC. The front equipment holders are attached to the front panel of the utility cart to front panel bosses utilizing bolts 27.

Likewise, four plastic rear equipment holders 28 are attached to the exterior of the rear panel of the utility cart. Like the front equipment holders, the rear equipment holders are also tubular in configuration, extruded from plastic and include a long bottom attachment bolt which acts as a bottom stop. Also in a like manner, the rear equipment holders are bolted to bosses on the rear panel. As shown, the rear equipment holders have a cross-sectional diameter that is smaller than the cross-sectional diameter of the front equipment holders. As such, the real equipment holders are better configured to retain smaller diameter items such as fishing rods or beach umbrellas, whereas the front equipment holders are ideal for carrying larger diameter items such as drink bottles. Of course, the front and rear equipment holders can all be the same size and configuration, or the rear equipment holders may have the larger diameter.

As can be seen best by reference to FIG. 4, four detachable support legs 40 are provided which are tubular in configuration and have a diameter appropriate to fit into support leg bosses 42 on the bottom surface of the bottom panel and located at the front and rear of the unit. The detachable legs are installed onto the utility cart and retained by the support leg bosses when the cart is stationary. One pair of detachable legs can be used if the user chooses not to remove the axle and wheels. Alternatively, the axle and wheels can be removed, and the second pair of detachable legs installed when the cart is to be stored for long periods of time or in other situations when an extra degree of stability is desired.

Figure 6:
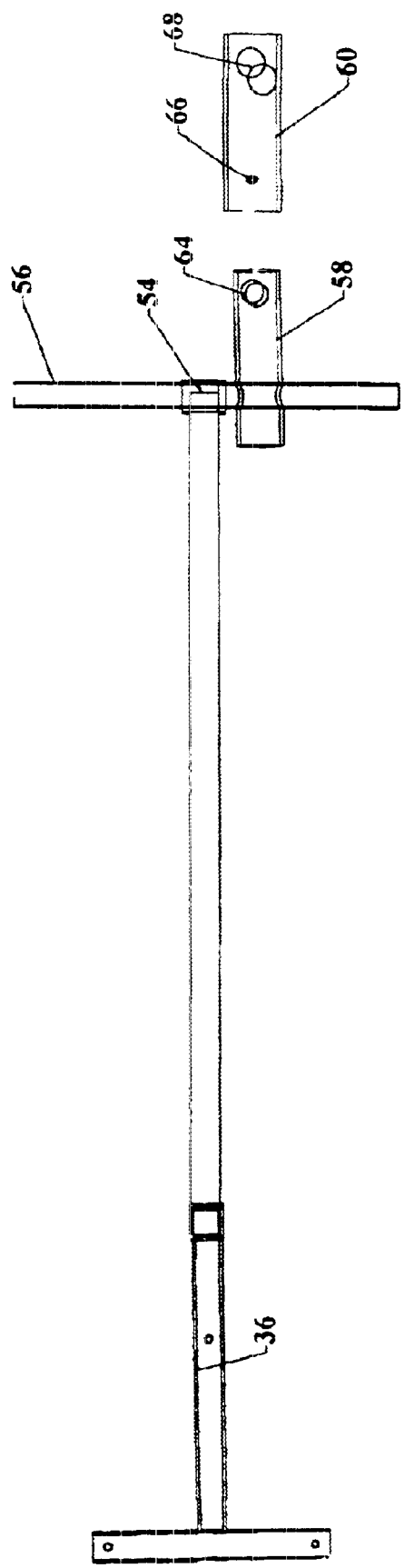
FIG. 6 is a plan view of the handle and bicycle attachment of the utility cart of the present invention showing it attached to the T-bar attachment of the utility cart.

The handle, which is designated generally as 44 and is seen in better detail by referencing FIGS. 5 through 7, can be utilized to pull the cart by hand by utilizing the cross bar 56 or to pull the cart by an ordinary bicycle by using the bicycle coupling unit 58 and 60. The handle riser 52 is a member having a hollow, square cross section and molded or formed from steel or other rigid material. At the lower (aft) extension, the handle riser has a vertical, straight aspect which is sized and configured to interact with the vertical extension of the T-shaped handle connector and is fastened into place by insertion of a bolt or pin through holes drilled in both members. At point 50, the handle riser bends forward presenting an arc-shaped member 52 which rises at least 22" at its highest point above the level of the bottom panel and descends back down to approximately 17" above the level of the bottom panel. The arc-shaped member extends to a distance of approximately 28" to 30" from the coupling aperture.

At the forward end and fitted perpendicular to the arc-shaped member is welded a member having a hollow round cross section 54 to receive the horizontal crossbar handle 56. The horizontal cross bar handle is a tubular member which slides through the welded tubular member 54 and is secured into place by rubber hand grips on both ends permitting the cart to be pulled by one or more people.

A bicycle coupler is provided which is composed of two concentric tubular pieces 58 and 60. The inner of the two concentric tubular pieces 58, having a first predetermined diameter, is drilled through at both ends with the two sets of drill holes at 90° orientation to each other. The rear drill hole 62 is oriented with its longitudinal axis substantially parallel to the plane of the earth as shown best in FIG. 5. The rear drill hole has a diameter appropriate to receive the horizontal cross bar handle. The rear drill hole is oversized in comparison with the diameter of the horizontal cross bar which allows vertical rotation. In other words, the horizontal cross bar handle is inserted into the aperture at the front of the arc-shaped member. Next, the rear drill hole of the inner tubular piece slides around the horizontal cross bar. Finally, the hand grips are placed over the cross bar to secure the units together.

The second drill hole 64 is provided through the inner tubular piece wherein the second drill hole is rotated 90° from the first drill hole. The second drill hole is thus oriented so that its longitudinal axis is substantially perpendicular to the plane of the earth.

A second outer tubular piece 60 is provided having a second predetermined diameter (larger than the predetermined diameter of the first tubular piece) wherein the second predetermined diameter is chosen so that the first tubular piece 58 can be inserted into the second tubular piece 60. The outer tubular piece is also drilled through at both ends. The aft hole 66 is sized to allow fitting of a ¼ inch pin connector and the forward hole has a diameter of approximately 1.125" and is bored at approximately 17.5 degrees from the vertical.

The bicycle coupler is assembled by inserting the forward end of the inner tubular piece into the aft end of the outer tubular piece. The forward hole of the inner tubular member and the aft hole of the outer tubular member are aligned and the ¼ inch connector pin is provided that is inserted through both sets of holes to connect the two tubular pieces. It is noted that the forward hole of the inner tubular member is oversized in comparison with the connector pin which allows for rotation of the assembly in a transverse direction.

The forward drill hole 68 of the outer tubular member 60 interacts with a seat post of an ordinary bicycle, i.e. the seat of the bicycle is removed, the seat post is inserted through the forward drill hole 68 of the outer tubular member, and the bicycle seat is replaced in its ordinary riding position. The front drill hole is of a diameter just large enough to permit rotation in a horizontal plane. Further, the height of the bicycle coupler relative to the bicycle seat post can be adjusted up or down through the utilization of tubular spacers or o-rings.

It will be appreciated that the utility cart can be operated and pulled by attachment to a bicycle in the manner described. It will also be appreciated that a user, or multiple user may pull the utility cart by grasping the horizontal cross bar, if attachment to a bicycle is not desired. Further, it will be appreciated that through the unique combination of elements presented by the invention herein, rotation along all three axes of motion are allowed which permits free and easy pulling by hand or by attachment to a conventional bicycle.

The foregoing in considered as illustrative only of the principles and preferred embodiment of the invention. Furthermore, since numerous changes and modifications will readily occur to one skilled in the art, it is not desired to limit the invention to the exact construction, operation and embodiment shown and described, and accordingly all suitable modification and equivalents may be resorted to, falling within the scope of the invention.

What is claimed:

1. A utility cart for transporting items from one place to another comprising
a main equipment carrying compartment having a front panel, a rear panel, and a bottom panel;
means for attaching said utility cart to the seat post of a bicycle, wherein said means for attaching said utility cart to the seat post of a bicycle further includes means for pulling said utility cart by hand;
at least one equipment retaining module attached to said front panel of said utility cart;
at least one equipment retaining module attached to said rear panel of said utility cart;
a plurality of pairs of axle support on said bottom panel of said utility cart; and
an axle having at least one wheel, wherein said axle is positioned by one of said pair of axle supports, thereby allowing a user to select a predetermined axle position.

* * * * *